United States Patent
Awano et al.

(10) Patent No.: US 10,129,410 B2
(45) Date of Patent: Nov. 13, 2018

(54) ECHO CANCELLER DEVICE AND ECHO CANCEL METHOD

(71) Applicant: MITSUBISHI ELECTRIC CORPORATION, Tokyo (JP)

(72) Inventors: Tomoharu Awano, Tokyo (JP); Satoru Furuta, Tokyo (JP); Tadashi Yamaura, Tokyo (JP)

(73) Assignee: MISTUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/510,639

(22) PCT Filed: Dec. 15, 2014

(86) PCT No.: PCT/JP2014/083151
§ 371 (c)(1),
(2) Date: Mar. 10, 2017

(87) PCT Pub. No.: WO2016/098164
PCT Pub. Date: Jun. 23, 2016

(65) Prior Publication Data
US 2017/0195496 A1    Jul. 6, 2017

(51) Int. Cl.
*H04M 9/08*      (2006.01)
*H04B 3/23*      (2006.01)
*H04M 1/60*      (2006.01)

(52) U.S. Cl.
CPC ............ *H04M 9/082* (2013.01); *H04B 3/232* (2013.01); *H04B 3/234* (2013.01); *H04M 1/6083* (2013.01)

(58) Field of Classification Search
CPC .................................................... H04M 9/082
(Continued)

(56) References Cited

U.S. PATENT DOCUMENTS

| | | |
|---|---|---|
| 5,546,459 A | 8/1996 | Sih et al. |
| 5,859,914 A | 1/1999 | Ono et al. |

(Continued)

FOREIGN PATENT DOCUMENTS

| | | |
|---|---|---|
| DE | 69431923 T2 | 11/2003 |
| DE | 112012001201 T5 | 12/2013 |

(Continued)

OTHER PUBLICATIONS

Habets et al., "Joint Dereverberation and Residual Echo Suppression of Speech Signals in Noisy Environments", IEEE Transactions on Audio, Speech, and Language Processing, vol. 16, No. 8, Nov. 2008, pp. 1433-1451.

*Primary Examiner* — Md S Elahee
(74) *Attorney, Agent, or Firm* — Birch, Stewart, Kolasch & Birch, LLP

(57) ABSTRACT

An echo canceller device includes a band adjuster including a filter for performing band adjustment by applying a gain to a signal in a specific frequency band of an input signal, an adaptive filter for inputting a speech reception signal, updating a filter coefficient, and generating a pseudo echo signal using the updated filter coefficient, a band corrector including a filter for correcting a frequency characteristic of a signal obtained by subtracting the pseudo echo signal from an input signal, to a frequency characteristic of the input signal prior to the band adjustment, and a residual echo suppressor for suppressing an echo component that remains in a signal, by a suppression amount, and the residual echo suppressor sets the suppression amount for a signal in a specific frequency band that has been subjected to the band adjustment.

5 Claims, 7 Drawing Sheets

(58) Field of Classification Search
USPC .................................. 379/406.05–406.08
See application file for complete search history.

(56) References Cited

U.S. PATENT DOCUMENTS

| | | |
|---|---|---|
| 2003/0076947 A1 | 4/2003 | Furuta et al. |
| 2009/0168993 A1 | 7/2009 | Yano et al. |
| 2012/0135787 A1 | 5/2012 | Kusunoki et al. |
| 2012/0323583 A1* | 12/2012 | Miyasaka ............ H04M 9/082 704/500 |
| 2013/0251169 A1 | 9/2013 | Awano et al. |

FOREIGN PATENT DOCUMENTS

| | | |
|---|---|---|
| JP | 10-41859 A | 2/1998 |
| JP | 2003-101445 A | 4/2003 |
| JP | 2012-114683 A | 6/2012 |

* cited by examiner

ECHO CANCELLER DEVICE AND ECHO CANCEL METHOD

TECHNICAL FIELD

The present invention relates to a technology of cancelling an echo of a speech reception signal that is mixed in a signal input to a microphone.

BACKGROUND ART

An echo canceller device is used in a loudspeaker calling device or the like, for the purpose of cancelling an echo of a speech reception signal that is mixed in a signal input to a microphone (hereinafter, referred to as an input signal), from the input signal. As described in Non-patent Literature 1, in many cases, the echo canceller device used for this purpose each is constituted of an adaptive filtering unit and a residual echo suppression unit. FIG. 5 illustrates a schematic diagram of the echo canceller device having this constitution.

An adaptive filtering unit 300 estimates (learns) an echo path h, generates a filter coefficient ĥ and a pseudo echo signal (echo replica), and cancels from an input signal input to a microphone.

Nevertheless, an echo that can be cancelled by the adaptive filtering unit 300 is approximately 30 dB, and all echo signals cannot be cancelled. Thus, a residual echo suppression unit 400 is often included in order to suppress residual echoes.

Nevertheless, residual echo suppressing processing simultaneously suppresses a speech transmission signal, for example, a signal of voice spoken to a microphone. Thus, a large suppression amount may have a negative influence on the quality of bidirectional simultaneous telephone call (double-talk) performed by a near-end speaker and a far-end speaker. For the purpose of enhancing the performance of the double-talk, it is effective to increase an amount of echoes cancelled by an adaptive filter and decrease the suppression amount of residual echo suppression as little as possible.

On the other hand, in handsfree telephone call, the power of an echo signal in a low-frequency band is often strong. This is attributed to the fact that the low-frequency band of a speech signal has strong power, and to the design of speakers and echo characteristics in a vehicle. Residual echo signals, which are residual signals remaining after echoes having the aforementioned feature have been cancelled with the adaptive filter, are likely to remain in the low-frequency band. FIG. 6 illustrates an example of input signals recorded in a vehicle. All of the input signals illustrated in FIG. 6 are assumed to be echo signals. FIG. 7 illustrates average powers at respective frequencies of an echo signal (input signal) illustrated in FIG. 6, and a residual signal remaining after the echo signal illustrated in FIG. 6 has been cancelled with an adaptive filter, i.e., a residual echo signal.

As illustrated in FIG. 7, it can be seen that a speech transmission signal has a peak of power in the vicinity of 500 Hz, and a residual echo signal similarly has large power in the vicinity of 500 Hz. If double-talk occurs in this vehicle, it is necessary to apply strong residual echo suppression on the vicinity of 500 Hz, for reducing the residual echo signal to an inaudible level for users. However, in the case where the residual echo suppression is applied, strong suppression is applied also to the vicinity of 500 Hz of the speech transmission signal, leading to deterioration in quality of double-talk.

In the speech transmission signal, as for a high-frequency band having small power, if a large scale of echo reduction is not performed with the adaptive filter, but echo reduction is performed by subsequent residual echo suppression, telephone transmission voice is not negatively affected. Nevertheless, as for the low-frequency band of the speech transmission signal, double-talk quality can be enhanced by reducing more echoes with the adaptive filter.

Thus, in an acoustic echo canceller disclosed in Patent Literature 1, the speech reception signal and the speech transmission signal are divided into a plurality of bands, and influence of an echo in each band is estimated, thereby determining a priority order. In each band, the adaptive filter determines processing based on the priority order. The estimation of influence of the echo is performed in such a manner that a higher priority order is allocated to a band in which echo feeling is considered to be acoustically felt the most. An adaptive filter in a high-priority band performs complicated processing with a large echo suppression effect, and an adaptive filter in a low-priority band performs simple processing. By determining a priority order in accordance with a band as described above, echo reduction processing, in which an acoustic characteristic is considered, is performed, and telephone call of high quality is provided.

CITATION LIST

Patent Literatures

Patent Literature 1: JP 10-41859 A

Non-Patent Literatures

Non-patent Literature 1: Emanuel A. P. Habets, Sharon Gannot, Israel Cohen and Piet C. W. Sommen, "Joint Dereverberation and Residual Echo Suppression of Speech Signals in Noisy Environments," IEEE Trans. Audio, Speech Lang. Process., vol. 16, no. 8, pp. 1433-1451, November 2008.

SUMMARY OF INVENTION

Technical Problem

Nevertheless, in the technology disclosed in the above-described Non-patent Literature 1, there is a problem in that an input signal is divided using a filter bank to perform band restriction, and signals of the respective divided bands are synthesized using a synthesis filter bank and output as transmission voice, and filtering is performed also on transmission voice, so that the voice quality of the transmission voice may cannot be maintained. In addition, there has been a problem in that delay is caused by the filter bank and the synthesis filter bank. Furthermore, there has been another problem in that a calculation amount increases due to use of a plurality of adaptive filters in accordance with the priority order.

The present invention has been devised for solving the above-described problems, and it is an object of the present invention to suppress a calculation amount without performing band division of an input signal, and to increase a cancellation amount of echo signals in a specific frequency band of an adaptive filter.

Solution to Problem

An echo canceller device according to the present invention includes a band adjuster including a filter to perform band adjustment by applying a gain to a signal in a specific frequency band of the input signal, an adaptive filter to input the speech reception signal, update a filter coefficient, and generate a pseudo echo signal using the updated filter coefficient, a band corrector including a filter to correct a frequency characteristic of a signal obtained by subtracting the pseudo echo signal generated by the adaptive filter from a signal that has been subjected to the band adjustment performed by the band adjuster, to a frequency characteristic of the input signal prior to the band adjustment performed by the band adjuster, and a residual echo suppressor to suppress an echo component that remains in a signal of which the frequency characteristic has been corrected by the band corrector, by a suppression amount set based on filter information of the band adjuster, and the residual echo suppressor sets the suppression amount for a signal in a specific frequency band that has been subjected to the band adjustment performed by the band adjuster in such a manner as to be lower than suppression amounts for signals in other frequency bands.

Advantageous Effects of Invention

According to the present invention, a calculation amount can be suppressed without performing band division of an input signal, and a cancellation amount of echo signals in a specific frequency band of an adaptive filter can be increased.

DESCRIPTION OF EMBODIMENTS

Figure 1:
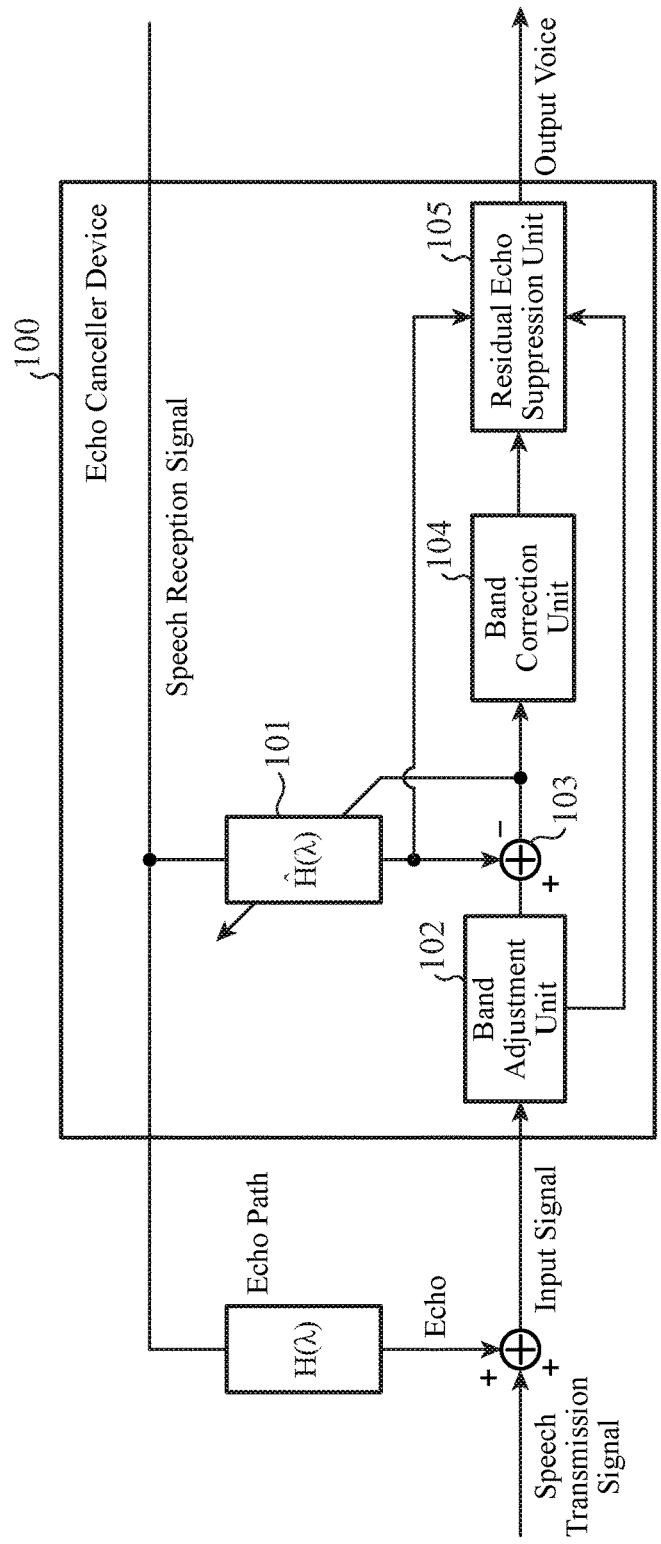
FIG. 1 is a block diagram illustrating a configuration of an echo canceller device according to a first embodiment.

In order to describe the present invention in more detail, a mode for carrying out the present invention will be described below with reference to the attached drawings.
First Embodiment
FIG. 1 is a block diagram illustrating a configuration of an echo canceller device 100 according to a first embodiment.
The echo canceller device 100 includes an adaptive filter 101, a band adjustment unit 102, a subtractor 103, a band correction unit 104, and a residual echo suppression unit 105. A speech reception signal is a signal by which voice of a far-end speaker is transmitted via a transmission path (not illustrated) to a near-end speaker side. A speech transmission signal is voice uttered by a near-end speaker. An input signal is a signal obtained by superimposing an echo component, which is generated from an output terminal (e.g., microphone, etc.) of the speech transmission signal via an echo path on the near-end speaker side, on the voice uttered by the near-end speaker.

A frequency-domain adaptive filter is used as the adaptive filter 101 for the simplicity of description, and a filter coefficient thereof is represented by a capital $\hat{H}$, and a transfer function representing an echo learned by the adaptive filter is similarly represented by a capital H.
The frequency-domain adaptive filter will be described using a Fast Least Mean Square (FLMS) algorithm. Nevertheless, the present invention according to the first embodiment has no restriction on an adaptive filter algorithm, and can be applied to all adaptive filters.
A coefficient update formula of the FLMS algorithm can be realized by a series of formulae represented by the following formulae (1) to (8). In addition, the calculation of the following formulae (1) to (8) is performed for each new block of M sets of input samples.

$$X_{2M \times 2M}(k) = \mathrm{diag}\{\mathrm{FFT}[x(kM-M), \ldots, x(kM), \ldots, x(kM+M-1)]^T\} \quad (1)$$

$$\hat{y}(k) = \text{The last } M \text{ elements of } \mathrm{IFFT}[X_{2M \times 2M}(k)\hat{H}_{2M}(k)] \quad (2)$$

$$e(k) = y(k) - \hat{y}(k) \quad (3)$$

$$E_{2M}(k) = \mathrm{FFT}[0_M^T \; e^T(k)]^T \quad (4)$$

$$P_i(k) = \gamma P_i(k-1) + (1-\gamma)|X_i(k)|^2, \; i=0, \ldots, 2M-1 \quad (5)$$

$$D_{2M \times 2M}(k) = \mathrm{diag}[P_0(k)^{-1}, \ldots, P_{2M-1}(k)^{-1}] \quad (6)$$

$$J_{2M}(k) = \text{The first } M \text{ elements of } \mathrm{IFFT}[D_{2M \times 2M}(k) X_{2M \times 2M}^H(k) E_{2M}(k)] \quad (7)$$

$$\hat{H}_{2M}(k+1) = \hat{H}_{2M}(k) + \mathrm{FFT}[J_{2M}^T(k) \; 0^T]^T \quad (8)$$

In the above-described formulae (1) to (8), FFT denotes fast Fourier transformation, IFFT denotes inverse fast Fourier transform, k denotes an index of a block, x(n) denotes a speech reception signal, and y(n) denotes an input signal (here, echo signal). $\hat{y}(n)$ denotes a pseudo echo generated by the adaptive filter 101.
In addition, a bold small letter denotes a vector with a length M, and denotes a signal sequence.
For example, $y(n) = [y(n), y(n-1), \ldots, y(n-M+1)]^T$ is defined in Formula (3).
In addition, a bold capital letter denotes a vector or a matrix, and a size is described at the lower right of the letter, and "diag" denotes a diagonal matrix.
$A^H$ denotes an Hermitian matrix for a matrix A. In addition, γ denotes a forgetting coefficient.
X(k) in Formula (1) denotes a diagonal matrix in which results of the FFT are arranged as diagonal components. Formulae (2) and (3) respectively denote a pseudo echo and a residual signal generated by the adaptive filter 101. Formula (4) denotes frequency conversion of the residual signal, and the purpose thereof is linear convolution. Formula (5) represents calculation of average power of the speech reception signal, and the average power is calculated using moving average. Formula (6) diagonally arranges an inverse number of an average power value obtained by Formula (5). Formula (7) is for calculating a coefficient update amount, and linear correlation processing is performed by frequency conversion on the right side. Formula (8) updates a coefficient.
The present invention according to the first embodiment is characterized in that the band adjustment unit 102 and the band correction unit 104 are included. The band adjustment unit 102 is a block for adjusting a frequency characteristic of an input signal, so as to enhance the function of echo cancellation in a specific band of the adaptive filter 101. In the band adjustment unit 102, a bandpass filter for applying a gain to a low-frequency signal is formed using, for example, an infinite impulse response (IIR) filter, and adjustment for increasing power in the low-frequency band of the input signal is performed. Accordingly, an echo cancellation characteristic of the adaptive filter 101 is varied, thereby improving the learning speed of low-frequency echo signals.

In the band adjustment unit 102, increasing the power in the low-frequency band of the input signal, i.e., providing a gain means an increase in the power in the low-frequency band in terms of y(k) in Formula (3). The same applies to $E_{2M}$ (k) in Formula (4) and $J_{2M}$ (k) in Formula (7), and the power in the low-frequency band similarly increases. The filter coefficients of the adaptive filter 101 in Formula (8) can be obtained in such a manner that the power in the low-frequency band becomes stronger. By using this filter coefficient, a pseudo echo with larger low-frequency power can be generated. As described above, the band adjustment unit 102 can change the characteristics of the adaptive filter 101.

Subsequently, a change in performance characteristic of the adaptive filter 101 due to the band adjustment of the band adjustment unit 102 will be described with reference to FIGS. 2 and 3.

Figure 2:
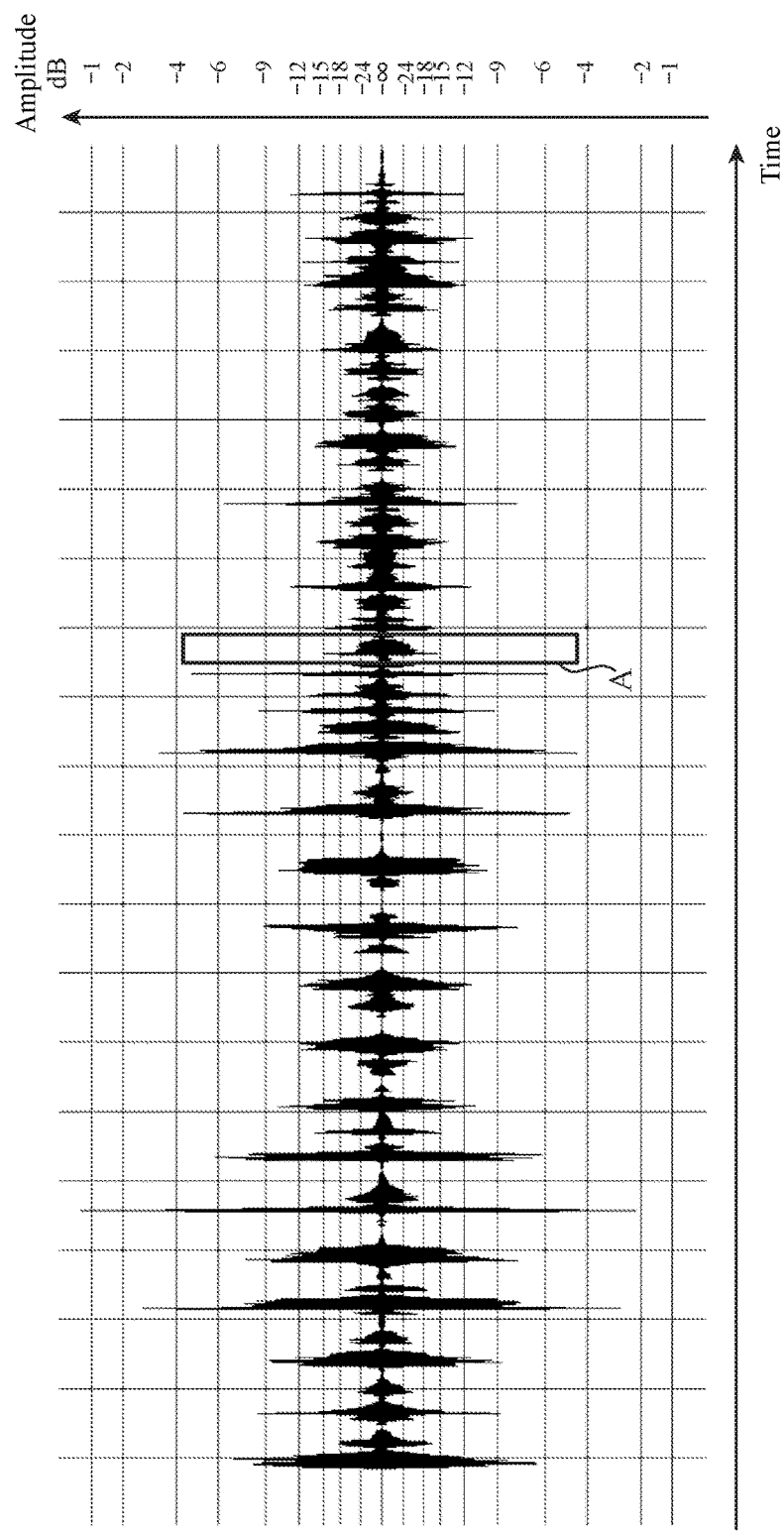
FIG. 2 is a diagram illustrating a speech signal waveform of double-talk.

FIG. 2 is a diagram illustrating an example of a speech signal waveform at the time when double-talk occurs. The data illustrated in FIG. 2 indicates a speech signal waveform of an input signal, for example, in a case in which handsfree telephone call is performed in a vehicle, and indicates a case in which voice of a far-end speaker is output from audio speakers and observed by a microphone in the vehicle together with voice of a near-end speaker. The change in performance characteristic of the adaptive filter 101 that depends on whether the band adjustment of the band adjustment unit 102 is performed for an input signal having the speech signal waveform illustrated in FIG. 2 will be described. In FIG. 2, an echo signal and a speech transmission signal mixedly exist. The description will now be given focusing on an echo signal indicated by an area A.

Figure 3:
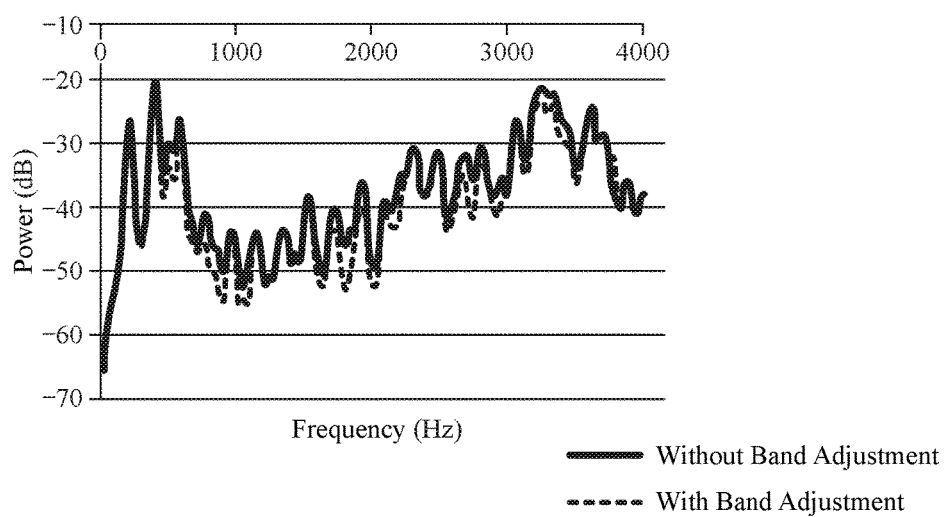
FIG. 3 is a diagram illustrating an effect of a band adjustment unit of the echo canceller device according to the first embodiment.

FIG. 3 illustrates residual echo power obtained after processing is performed by the adaptive filter 101 without the band adjustment performed by the band adjustment unit 102, and residual echo power obtained after the band adjustment performed by the band adjustment unit 102 and the processing implemented by the adaptive filter 101. A bandpass filter with a resonance frequency of 750 Hz, a gain of 9.0 dB, and a Q value of 0.7 is used as the band adjustment unit 102. As seen from FIG. 3, by applying the band adjustment performed by the band adjustment unit 102, the residual echo power at frequencies up to 1000 Hz is reduced by approximately 6 dB at the maximum, and the effect of the band adjustment can be seen.

The subtractor 103 subtracts a pseudo echo signal generated by the adaptive filter 101, from a signal that has been subjected to the band adjustment performed by the band adjustment unit 102. The band correction unit 104 performs filter processing in which a frequency characteristic of a signal, from which the pseudo echo signal has been subtracted by the subtractor 103, is returned to a frequency characteristic of an input signal prior to the band adjustment implemented by the band adjustment unit 102. The band adjustment unit 102 changes not only the frequency characteristics of echo signals, but also the frequency characteristics of speech transmission signals and noise signals. Thus, after the filter processing is performed by the adaptive filter 101, the band correction unit 104 performs the processing of returning the frequency characteristic of the input signal prior to the band adjustment implemented by the band adjustment unit 102, to the original frequency characteristic.

In the example illustrated in FIG. 3, the band correction unit 104 uses a bandpass filter with a resonance frequency of 750 Hz, a gain of −9.0 dB, and a Q value of 0.7.

The residual echo suppression unit 105 performs residual echo suppression on a signal of which the frequency characteristic has been corrected by the band correction unit 104. The residual echo suppression unit 105 determines a suppression amount based on a resonance frequency, a gain, and a Q value, each of which corresponds to information on the filter generated by the band adjustment unit 102. A method such as a method of reflecting an inverse characteristic with respect to the characteristic of the filter generated by the band adjustment unit 102, in a residual echo suppression amount, and a method of simply reducing a suppression amount of a frequency in the vicinity of a resonance frequency in the band adjustment unit 102 can be applied. A suppression amount of transmission voice can be thereby reduced, and voice quality can be maintained.

As described above, according to the first embodiment, the echo canceller device is configured to include the adaptive filter 101 that updates a filter coefficient using the speech reception signal and the signal from the subtractor 103 as inputs and generates a pseudo echo signal using the updated filter coefficient, the band adjustment unit 102 that adjusts a gain in a direction in which the power of an input signal in the low-frequency band becomes stronger, the band correction unit 104 that returns the frequency characteristic of a signal, which is obtained by subtracting a pseudo echo component from a signal that has been subjected to the band adjustment, to the frequency characteristic of the input signal prior to the band adjustment, and the residual echo suppression unit 105 that performs residual echo suppression based on the characteristic of a filter generated by the band adjustment unit 102, so that the consumption amount of an echo signal in the low-frequency band in the adaptive filter 101 can be increased without performing band division of an input signal. In addition, the echo canceller device 100 having high double-talk performance can be obtained without deteriorating the echo cancellation performance of the adaptive filter 101. In addition, as described above, in a case where IIR filters are applied to the band adjustment unit 102 and the band correction unit 104, the calculation amount of the echo canceller device 100 can be reduced.

In addition, in the above-described first embodiment, the band adjustment unit 102 that increases the power in the low-frequency band has been described. Nevertheless, the frequency band is not limited to the low-frequency band, and the band adjustment unit 102 may be configured to increase power in a specific band.

Second Embodiment

In handsfree telephone call, a signal band of a speech reception signal varies, depending on a communication network. In Europe, services of wide-bandwidth telephone call (50 to 7000 Hz) have been already started. Nevertheless, in some areas, only narrow-bandwidth telephone call (300 to 3400 Hz) is operated. Thus, voice quality over the telephone needs to be maintained in accordance with each communication situation. Thus, in the second embodiment, the configuration of the echo canceller device is described that realizes adequate echo cancellation performance and high double-talk performance even in a situation in which the voice band of a speech reception signal varies.

Figure 4:
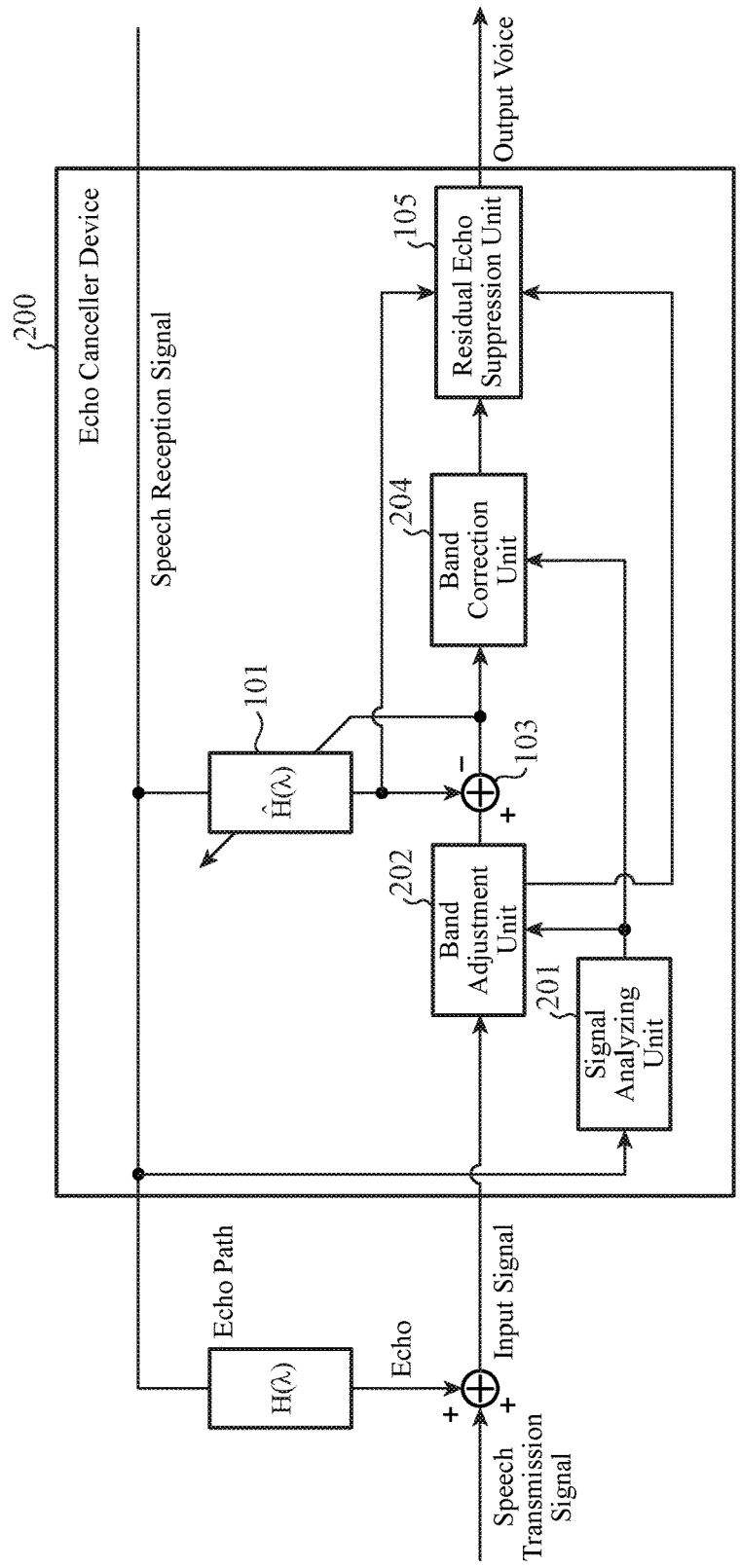
FIG. 4 is a block diagram illustrating a configuration of an echo canceller device according to a second embodiment.
Figure 5:
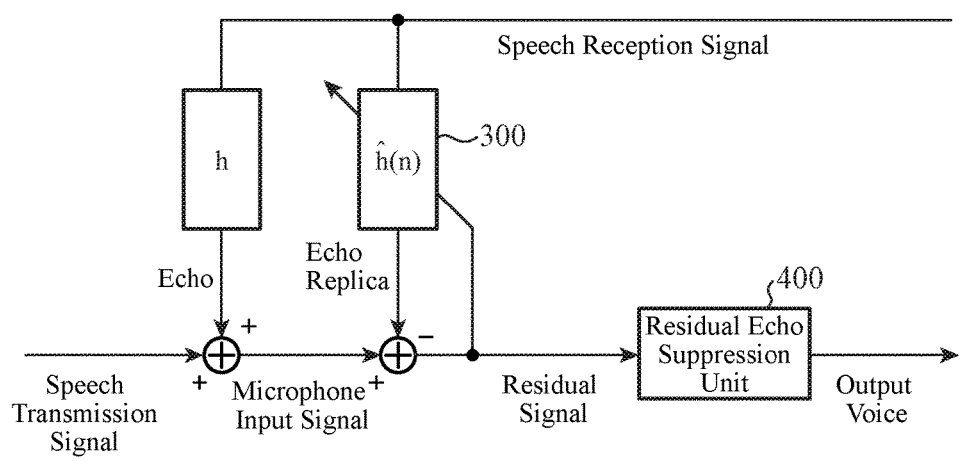
FIG. 5 is a schematic diagram of a conventional echo canceller device.
Figure 6:
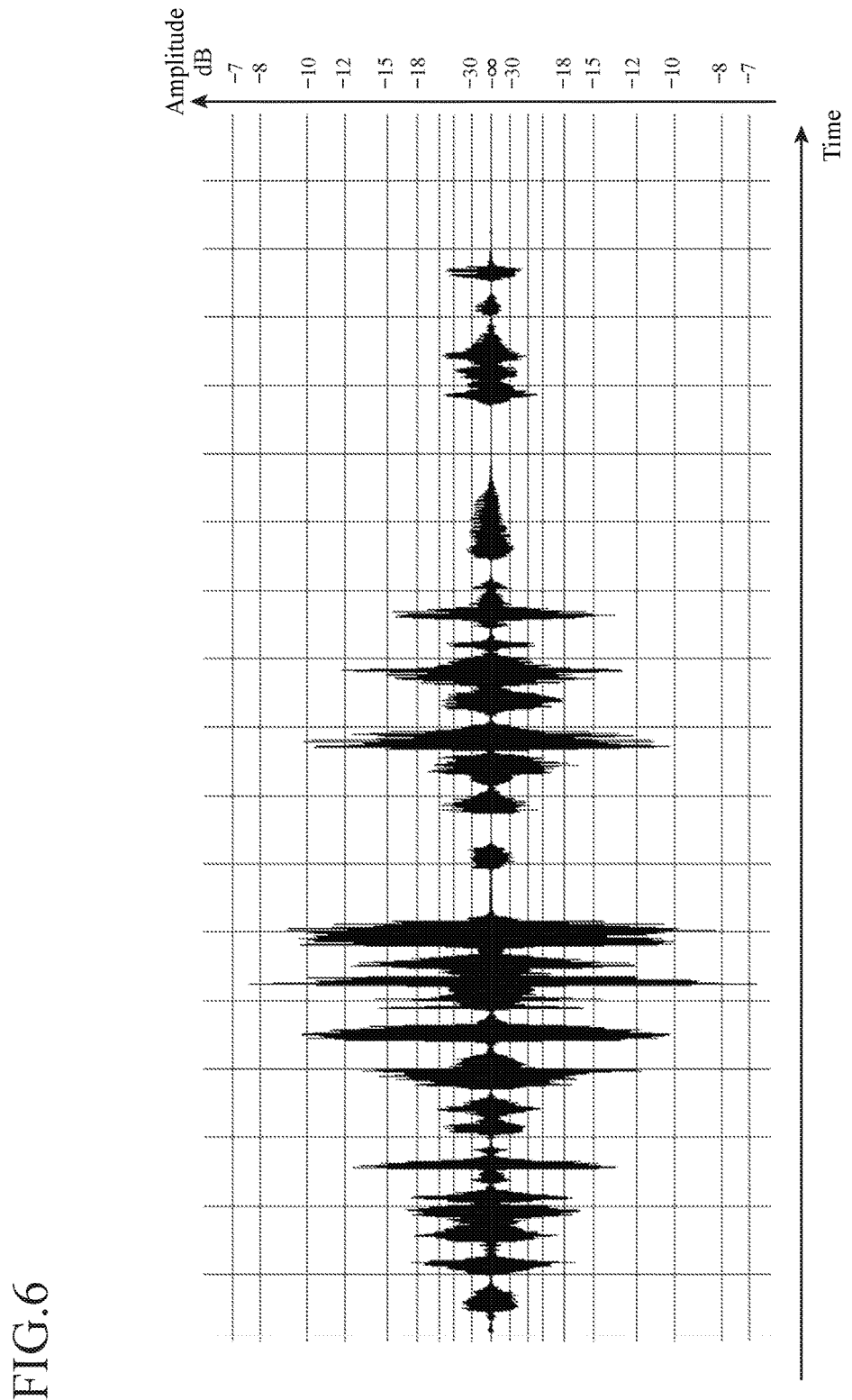
FIG. 6 is a diagram illustrating an example of an echo signal.
Figure 7:
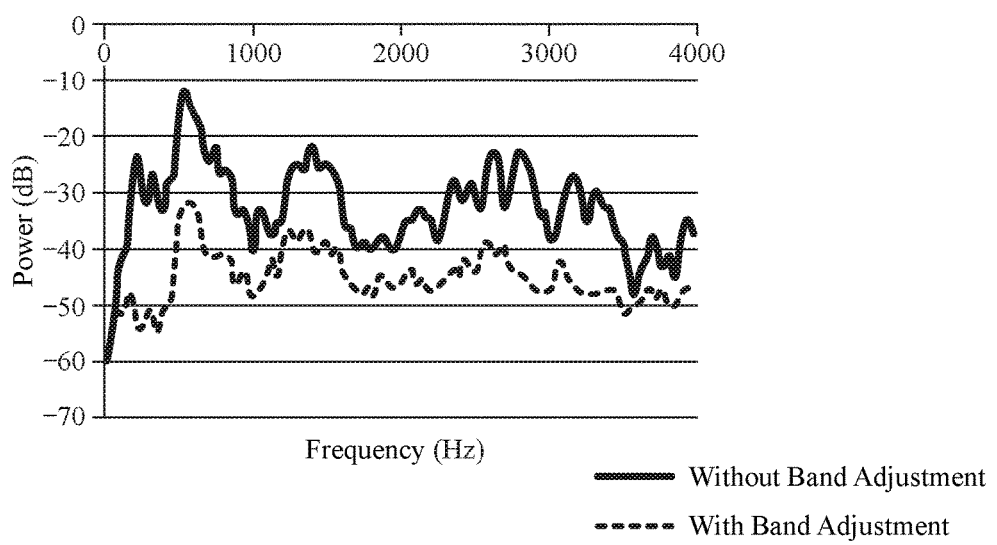
FIG. 7 is a diagram illustrating average powers at each frequency of an echo signal and a residual echo signal.

FIG. 4 is a block diagram illustrating a configuration of an echo canceller device 200 according to the second embodiment.

The echo canceller device 200 according to the second embodiment includes a signal analyzing unit 201 in addition to the components of the echo canceller device 100 described in the first embodiment. In addition, a band adjustment unit 202 and a band correction unit 204 are provided in place of the band adjustment unit 102 and the band correction unit 104.

In the following description, the same signs as the signs used in the first embodiment are assigned to the same or corresponding parts as the components of the echo canceller device 100 according to the first embodiment, and therefore the description will be omitted or simplified.

The signal analyzing unit 201 analyzes a voice band of a speech reception signal and determines whether it is narrow-bandwidth telephone call or wide-bandwidth telephone call. Various methods of analyzing a communication band can be applied. For example, a speech reception signal passes through a high-pass filter that can extract a signal of 4 kHz or higher, and if the power of a signal in the high-frequency band falls below a set threshold value, the telephone call is determined to be narrow-bandwidth telephone call, and if the power exceeds the threshold value, the telephone call is determined to be wide-bandwidth telephone call.

The band adjustment unit 202 sets a filter to be used for band adjustment, based on the analysis result of the signal analyzing unit 201. If the analysis result indicates the narrow-bandwidth telephone call, for example, a resonance frequency is set to 500 Hz to 1000 Hz. If the analysis result indicates the wide-bandwidth telephone call, for example, a resonance frequency is set to 200 to 300 Hz. Thus, by setting the resonance frequency in accordance with the voice band at the time of the wide-bandwidth telephone call, the echo cancellation performance of the adaptive filter in response to an echo signal with 50 to 300 Hz that has strong power can be enhanced.

The band correction unit 204 similarly uses a filter corresponding to the filter used by the band adjustment unit 202, based on the analysis result of the signal analyzing unit 201. The residual echo suppression unit 105 performs residual echo suppressing processing. Similarly to the first embodiment, in the residual echo suppressing processing, the suppression of residual echoes is relieved in a band in the vicinity of a resonance frequency of the band adjustment unit 202, and the suppression of the residual echoes is performed without impairing an input signal.

As described above, according to the second embodiment, the echo canceller device is configured to include the signal analyzing unit 201 that analyzes a voice band of a speech reception signal, the band adjustment unit 202 that sets a filter to be used for band adjustment, based on an analysis result of the signal analyzing unit 201, and the band correction unit 204 that sets a filter to be used for band modification, based on the analysis result of the signal analyzing unit 201, so that high echo cancellation performance and high double-talk performance can be obtained in both narrow-bandwidth telephone call and high-bandwidth telephone call.

In addition, the above-described second embodiment represents the case in which the signal analyzing unit 201 is provided as the internal element of the echo canceller device 200. Alternatively, the analysis result of a voice band may be acquired from the outside.

Aside from the foregoing, in the present invention, the embodiments can be freely combined, an arbitrary constituent element in the embodiments can be corrected, or an arbitrary constituent element in the embodiments can be omitted, without departing from the scope of the invention.

INDUSTRIAL APPLICABILITY

The echo canceller device according to the present invention can increase an echo consumption amount of an echo signal in a specific band. Thus, the echo canceller device is suitable for being applied to a loudspeaker calling device or the like in which handsfree telephone call is performed, and for being used for enhancing double-talk quality.

REFERENCE SIGNS LIST

100, 200 echo canceller device; 101 adaptive filter; 102, 202 band adjustment unit; 103 subtractor; 104, 204 band correction unit; 105 residual echo suppression unit; 201 signal analyzing unit.

The invention claimed is:

1. An echo canceller device to cancel, from an input signal including an echo component of a speech reception signal and a speech transmission signal, the echo component of the speech reception signal, the echo canceller device comprising:
   a band adjuster including a filter to perform band adjustment by applying a gain to a signal in a specific frequency band of the input signal;
   an adaptive filter to input the speech reception signal, update a filter coefficient, and generate a pseudo echo signal using the updated filter coefficient;
   a band corrector including a filter to correct a frequency characteristic of a signal obtained by subtracting the pseudo echo signal generated by the adaptive filter from a signal that has been subjected to the band adjustment performed by the band adjuster, to a frequency characteristic of the input signal prior to the band adjustment performed by the band adjuster, and
   a residual echo suppressor to suppress an echo component that remains in a signal of which the frequency characteristic has been corrected by the band corrector, by a suppression amount set based on filter information of the band adjuster, and
   wherein the residual echo suppressor sets the suppression amount for a signal in a specific frequency band that has been subjected to the band adjustment performed by the band adjuster in such a manner as to be lower than suppression amounts for signals in other frequency bands.

2. The echo canceller device according to claim 1, wherein the residual echo suppressor sets a suppression amount of the residual echo component, based on a resonance frequency, a gain, and a Q value in filter information of the band adjuster.

3. The echo canceller device according to claim 1, wherein the band adjuster and the band corrector set the filters according to a voice band of the speech reception signal.

4. The echo canceller device according to claim 3, further comprising a signal analyzer to analyze the voice band of the speech reception signal, and to determine whether the voice band of the speech reception signal is a narrow-bandwidth telephone call band, or a high-bandwidth telephone call band.

5. An echo cancel method for cancelling, from an input signal including an echo component of a speech reception signal and a speech transmission signal, the echo component of the speech reception signal, the echo cancel method comprising:
   performing band adjustment by applying a gain to a signal in a specific frequency band of the input signal;
   inputting the speech reception signal, updating a filter coefficient, and generating a pseudo echo signal using the updated filter coefficient;

correcting a frequency characteristic of a signal obtained by subtracting the pseudo echo signal generated by an adaptive filter from the input signal that has been subjected to the band adjustment, to a frequency characteristic of the input signal prior to implementation of the band adjustment, and suppressing an echo component that remains in a signal of which the frequency characteristic has been corrected based on band adjustment information of the band adjustment.

* * * * *